O. WALTHER.
BEET TOPPER.
APPLICATION FILED OCT. 11, 1917.

1,310,849.

Patented July 22, 1919.
4 SHEETS—SHEET 1.

INVENTOR
OTTO WALTHER.
BY Edwin Guthrie
ATTORNEY

O. WALTHER.
BEET TOPPER.
APPLICATION FILED OCT. 11, 1917.

1,310,849.

Patented July 22, 1919.
4 SHEETS—SHEET 2.

INVENTOR
OTTO WALTHER.
BY Edwin Guthrie
ATTORNEY

O. WALTHER.
BEET TOPPER.
APPLICATION FILED OCT. 11, 1917.
1,310,849.
Patented July 22, 1919.
4 SHEETS—SHEET 3.
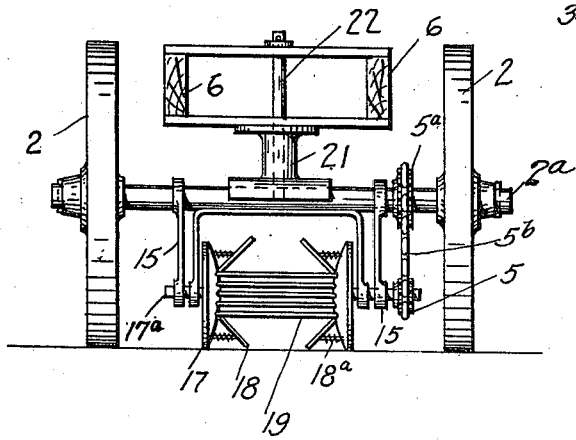
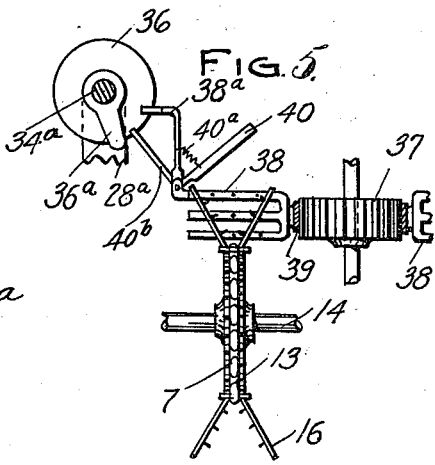
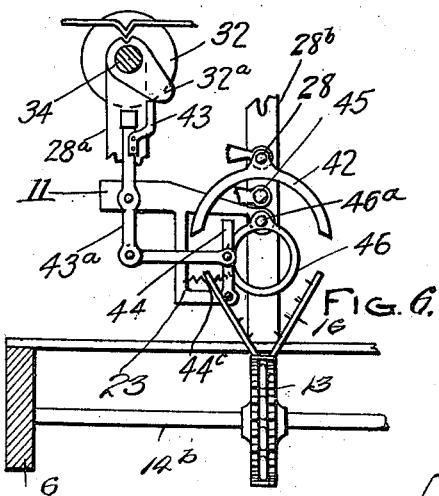
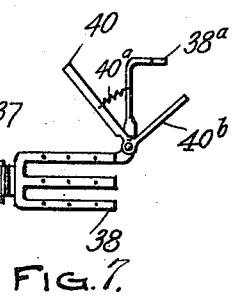
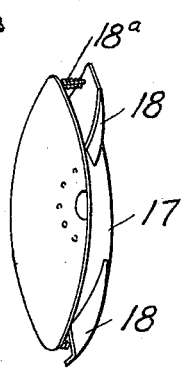
INVENTOR
OTTO WALTHER.
BY Edwin Guthrie
ATTORNEY

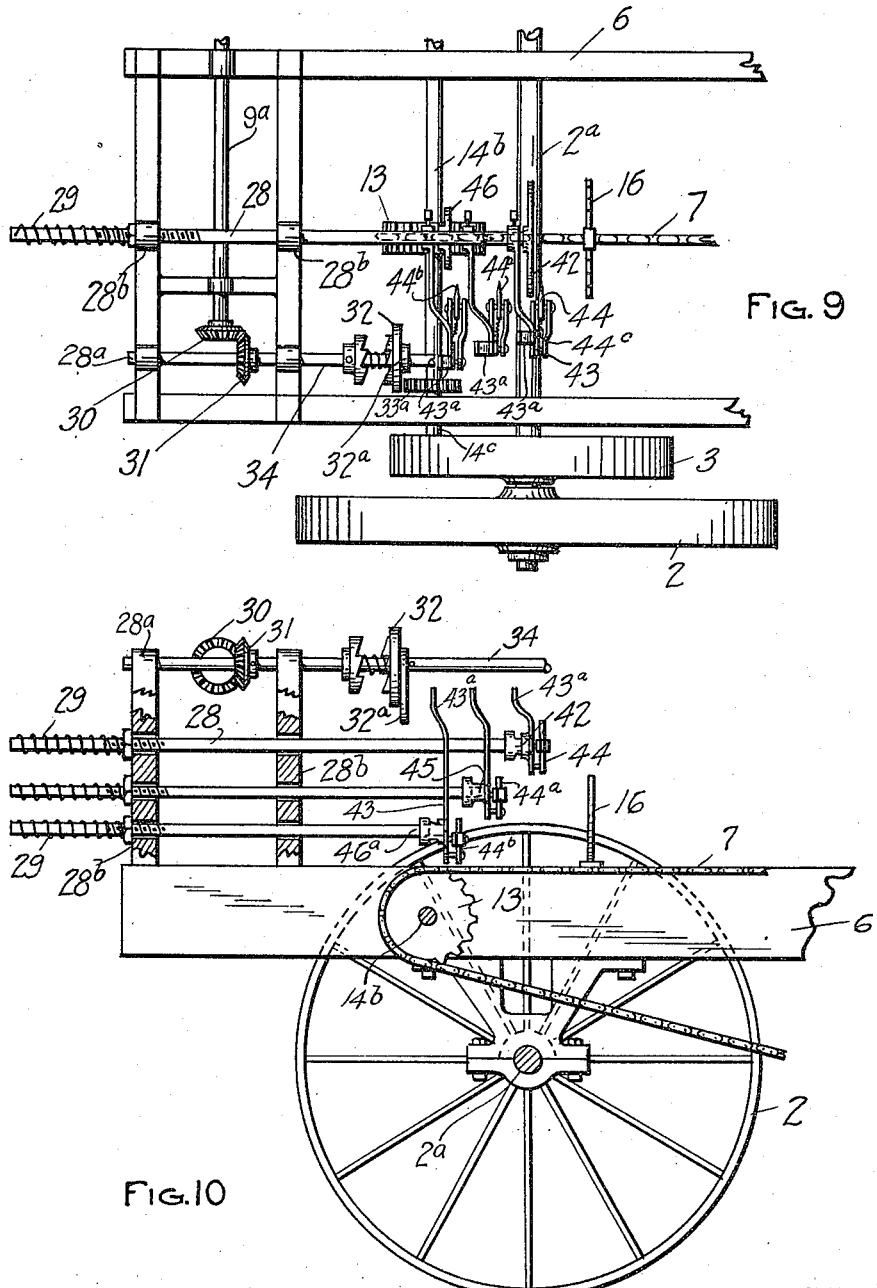

UNITED STATES PATENT OFFICE.

OTTO WALTHER, OF BLOOMINGTON, ILLINOIS.

BEET-TOPPER.

1,310,849.  Specification of Letters Patent. Patented July 22, 1919.

Application filed October 11, 1917. Serial No. 196,060.

*To all whom it may concern:*

Be it known that I, OTTO WALTHER, a subject of Germany, residing at Bloomington, county of McClain, and State of Illinois, have invented certain new and useful Improvements in Beet-Toppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to beet-topping machines and belongs to the class of vegetable harvestry vehicular contrivances that are intended to be drawn along astride of the rows of the plants in the ground and to pull them out of the ground, and each machine having a periodic operation brought about by the contact of each beet with a member of suitable mechanism, constructed and positioned to cut off the leaves and the tops of the beets, which fall to the ground, or into a receptacle arranged to receive them.

The object of this invention is the production of a beet topping machine, having parts of special construction and arrangement and including different beet gages, designed to catch beets of different sizes, the gages being provided with means for setting the knives-operating mechanism in motion. In this invention, each gage carries a knife which is caused to be brought down in front of each gage, and any number of the gages may be moved together in group, the entire group being quickly returned to the starting place by spring action, as soon as the gage concerned is relieved from its engagement with the beet.

Regarding the accompanying drawing illustrating the arrangement of various parts of this invention:

Fig. 3 is a side view of all parts assembled, the supporting wheels of the machine on the side toward the observer having been removed, and the side of the frame broken away to disclose parts otherwise hidden. In this view the axles and transverse shafts are illustrated in cross-section.

Fig. 4 is an end view from the right with respect to Fig. 1, showing the beet picker and operating devices. In this view the plow has been removed from before the picker, and various parts omitted in rear thereof and above the frame.

Fig. 5 is a fragmentary detail view, on a somewhat enlarged scale, showing the beet leaf forks carrying the leaf-cutting knives and their actuating devices. The revoluble arm for operating the knives, together with the shaft bearing the arm and the movable member of the clutch, the same being a contact disk for the trip fingers or levers, are also set forth. The end of the beet conveyer is also shown in Fig. 5, and the band or chain carrying the beet leaf forks is illustrated in section.

Fig. 6 is a fragmentary and partly sectional detail view of the beet topper mechanism, and shows one of the beet gages, with means for centering or positioning the beet for the operation of the beet-topping cutter or blade. This view is drawn upon a slightly increased scale from that used in Figs. 1 and 3. In this figure is shown the shaft bearing the revolving arm which strikes and trips the lever that moves the blade for topping the beets. There is also illustrated the spring for returning the blade to its starting position. Portions of the supports for the parts mentioned are shown in this view.

Fig. 7 is an end view of the sprocket band or chain, shown on one of its wheels carrying it, and illustrating the usual form of the leaf forks projecting from and borne by the band, and there are also shown the pivotal spring-returned knives for leaf-topping the beets, together with the upwardly-extending bent contact finger for operating the clutch to set in motion the devices which actuate the knives. In this figure the scale of drawing has been somewhat increased.

Fig. 8 is a perspective view of one of the concave or dished picker disks, showing the picker plates on the convex side of the disk near the rim, and the springs for holding the plates yieldingly in position with the upper or outer portions of the plates spaced from the rim of the disk.

Figure 1:
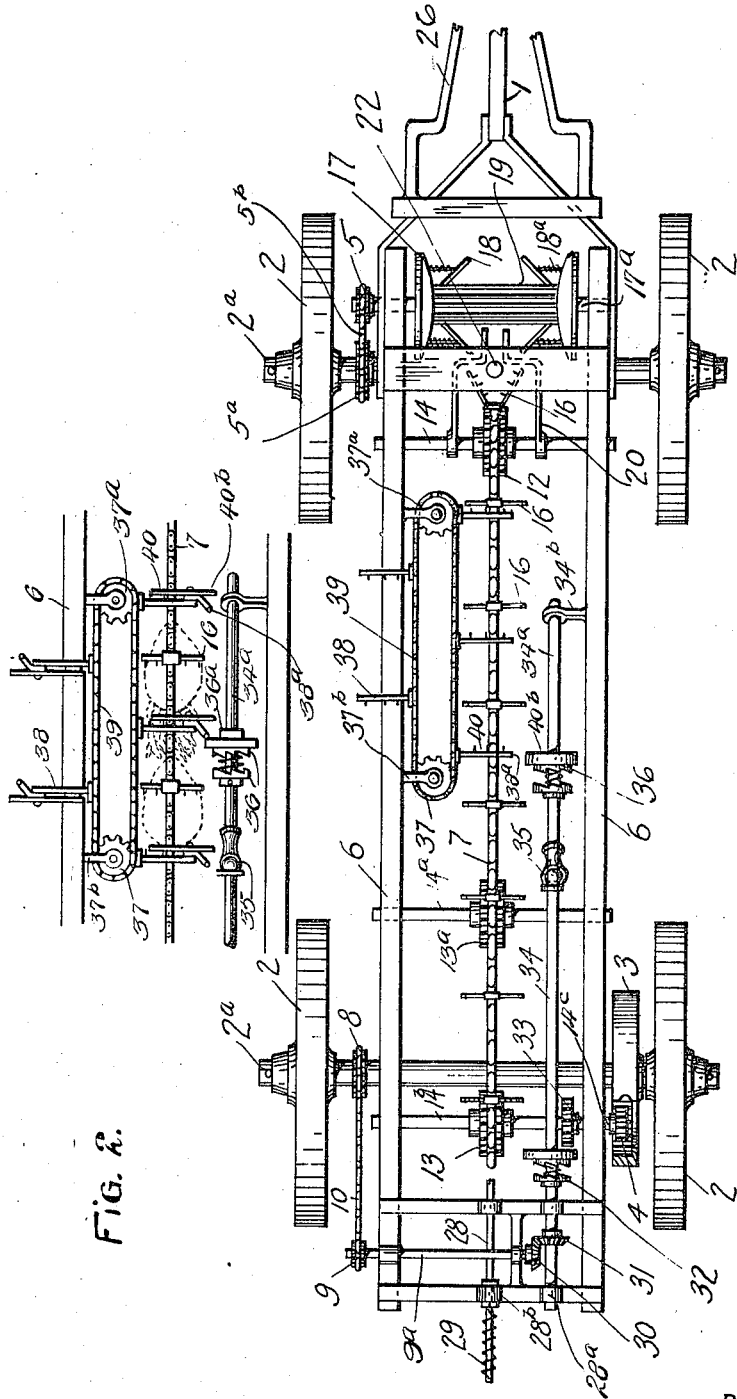
Figure 1 represents a top view of all the parts assembled, with the exception of the plow at the front of the frame, and of the knives and devices operating them.
Figure 2:
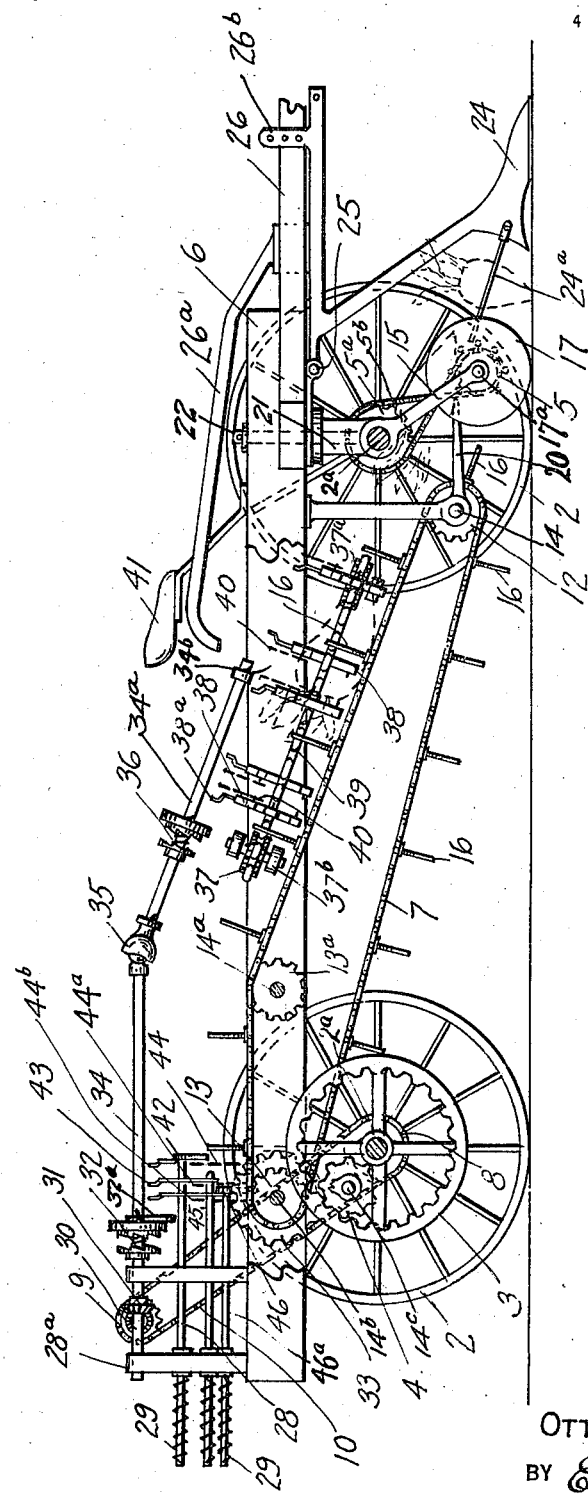
Fig. 2 is a plan view of the chain carrying the beet leaf forks, showing the knives for cutting the leaves, and the parts moving with the chain to engage the clutch on the inclined shaft which carries the arm for actuating the knives.

Fig. 9 is a top plan view, slightly enlarged, of the rear end of this invention as set out in Fig. 1, showing the knives and the devices operating them to complete the removal of the beet tops.

Fig. 10 is a side view of the end of this invention as shown in Fig. 9, illustrating the knives and the devices for operating them. In this view the supporting wheel and hollow gear shown in Fig. 9 are absent and the axle is shown in section.

Throughout the description and drawing the same number is employed to refer to the same part.

Considering the drawings, it will be noted that this invention includes a vehicular member which in this description is termed the truck. The truck is provided with the supporting wheels 2, 2, upon the revoluble axles 2ª, 2ª, and it has a frame comprising the side pieces 6, 6, as best shown in Figs. 1 and 3. At the front of the truck is a plow 24, having a rearwardly-projecting handle 24ª by which the plow may be raised. The handle 24ª is intended to be grasped by the hands of a person on the ground and near the plow, when for any reason the plow is to be lifted. The plow has a pivotal connection 25 with an overframe or carrier 26, and a gage plate 26ᵇ which may be secured by a suitable pin to the carrier 26, to hold the plowshare higher or lower as may be advantageous during the operation. The pin, not shown, may be passed through either of the perforations illustrated in the plate 26ᵇ and over the carrier 26. When it is necessary for the driver occupying seat 41 to raise the plow for any reason, he grasps the long handle 26ª that extends backward and near the seat, and he is able to tilt the plow upwardly on the pivotal joint 25. The truck is intended to be drawn along by animals hitched to the tongue 1.

Immediately in rear of the plow is the beet picker, best illustrated in Figs. 1, 3 and 4. The picker comprises the twin, dished disks such as the disk 17, carried by a transverse shaft 17ª, revoluble in hangers 15, and driven by pulleys 5 and 5ª connected by the crossed belt 5ᵇ. The dished picker disks are arranged opposite to each other with their convex sides toward each other. Each disk has at diametrical or equidistant points upon its convex face the picker plates such as the plate 18, and these plates are spaced from the disk at their outer ends by coil springs such as the spring 18ª. The picker plates as they revolve grasp each beet plowed up and raise it from the ground. The picker disks are spaced and held apart at a suitable distance by means of the connecting rods 19. As the picker turns carrying a beet upwardly it brings the beet against a beet taker 20 which takes the beet from the picker, and causes it to be engaged by the V-shaped holder 16, usually provided with spines as illustrated, and forming a projecting part on a conveyer 7. The beet is now carried to the leaf cutter mechanism, by which a portion of the leaves of its top are cut off. This mechanism is best illustrated in Fig. 5, and its arrangement with respect to the machine is shown in Figs. 1 and 3. The leaf cutter mechanism comprises two like sprocket wheels 37 and 37ª, the former located at a higher point than the latter, causing the band or chain 39 on the two sprockets to run in an inclined direction. The chain 39 carries the projecting leaf forks in any desired number, such as the forks 38, 38, also illustrated in Fig. 7, and each leaf fork bears a vertically disposed bent finger 38ª to which is pivoted the cutter blade 40. This cutter is a right-angle structure or piece as shown, and it is yieldingly held in a certain attitude with respect to the finger 38ª by means of the coil return spring 40ª. The leaf forks serve to comb out the beet leaves for the action of the blade, and as the truck is drawn along and the working members move as designed, each leaf fork slips into line directly in the path of one of the beet holders 16 on the conveyer 7. Thus, the movement of the conveyer is communicated to the leaf forks and the chain to which they are attached. As the beet and holder 16 and leaf fork 38 pass along toward the rear of the truck, the bent finger 38ª makes contact with a disk, which is the movable member of a clutch 36, and as the disk then becomes connected with the revolving inclined portion 34ª of the clutch shaft 34, a revolving arm 36ª is caused to strike the outer leg of the right angle blade 40 whereby the knife or cutter is quickly moved downwardly near the leaf fork cutting off a portion of the leaves, and as quickly returned to its starting place by the reaction of the return spring 40ª. In Fig. 3 the flexible and elastic bent fingers 38ª of the leaf forks or combs 38 are shown in position to engage the clutch 36 on the inclined shaft 34ª. The fingers are made of flexible spring metal sufficiently stiff to push the movable member of the clutch 36 into engagement with the fixed member on the shaft, yet yielding readily under the force of chain 39 to permit them to slip past the clutch disk after the knives one after the other are actuated.

As best shown in Figs. 1 and 3, and as illustrated particularly in Fig. 3, the conveyer 7 is carried on the sprocket wheel 12 on the transverse shaft 14, at the lowest part or front end of the conveyer. From the sprocket wheel 12 the conveyer passes upwardly in an inclined direction substantially parallel to the inclined portion 34ª of the clutch shaft 34, where it is further supported upon the intermediate sprocket wheel 13ª on the transverse shaft 14ª. The lower end of the inclined portion 34ª of the clutch shaft 34 is held revoluble in the end of a bearing bracket or shaft support 34ᵇ projecting from the side piece 6 of the frame, as illustrated in Fig. 1. From the sprocket wheel 13ª the conveyer passes horizontally to the rear conveyer sprocket 13 on the transverse shaft 14ᵇ.

After the beet carried by the conveyer 7 leaves the leaf cutting mechanism described, it passes along the horizontal and uppermost path of the conveyer until it comes into contact with one or another of a plurality of beet gages such as the gage 42, or, the annular centering gage 46. The gage 42 is in the shape of an arc of a circle and of a size designed to take beets of a corresponding size. The gage is attached to a rod 28, and it slides lengthwise and horizontally through suitable orifices in supporting posts such as the post 28ᵇ set out in Fig. 6. The parts just above described are best shown in Fig. 6. In Figs. 3 and 10 the position of the gage 42 with respect to the truck frame is most clearly illustrated, and when it is forced rearwardly by the beet upon the moving conveyer, the coil return spring 29 upon the rod is extended. This spring is secured to the end of the rod 28 and to the post 28ª supporting the rod 28, and when the pressure is relieved the spring returns the gage and rod to their starting positions. The rod 45 may also carry a gage if desired, and it is to be understood that the number of guiding rods and attached gages is in no manner limited by the drawings and this explanation thereof. Each gage is provided with a beet-topping knife such as the pivoted knife 44 best shown in Fig. 6, and the knife is yieldingly maintained in a given position by means of a return spring such as the spring 44ᶜ. A lever 43ª is connected with the knife 44, and the lever has a finger 43 that projects upwardly from it at the top of the lever. If a beet engages the annular centering gage 46, that gage and the sliding rod 46ª to which it is attached will be forced rearwardly until the finger 43 makes contact with a disk which is the movable member of a clutch 32 on the clutch shaft 34. The clutch engages and the arm 32ª is revolved and strikes the head of the lever 43ª, moving the knife 44 quickly across the gage 46 and cutting off the top of the beet. The knife is as quickly returned to its starting place by the spring 44ᶜ. In Fig. 3 the positions are indicated for several beet-topping knives 44, 44ª and 44ᵇ. There are as many knives and knife-operating mechanisms as there are beet gages.

As above stated, by this invention the beets are plowed out of the ground rows by the plow 24 as the truck is drawn along, and each beet is picked up by the picker disks and plates and transferred by the taker 20 to the holder of the conveyer. To operate the conveyer, the rear axle 2ª of the truck is provided with an attached hollow gear 3 that revolves with the axle and meshes with a pinion 4 on a transverse shaft 14ᶜ, which lies just above the axle as is shown in Fig. 3. On the shaft 14ᶜ there is also a gear wheel 33 and this gear wheel coacts with a gear wheel 33ª upon the transverse shaft 14ᵇ, which shaft carries also the rearmost conveyer sprocket 13 from which the conveyer takes its motion.

As best illustrated in Fig. 1, the clutch shaft 34 and its inclined portion 34ª, to which it is connected by the ball-and-socket joint 35, derive their movement from the sprocket 8 which rotates with the revoluble rear axle 2ª of the truck, and is connected with the sprocket 9 by the chain 10. The sprocket 9 is placed at the outer end of the transverse shaft 9ª, and at the other end of the shaft is a bevel gear 30 that engages a bevel gear 31 on the clutch shaft 34 which is thus properly driven. The clutch shaft is supported by suitable posts or standards 28ª, as shown in Figs. 1 and 3.

In the operation of this invention, the driver occupies the seat 41, within convenient reach of the plow handle 26ª. The seat 41 is erected upon the frame of the truck, and the frame is supported upon the front axle of the truck by a pillar 21 to which the frame is connected by the ordinary king pin 22. The animals are harnessed to the tongue 1.

The plowed beets are raised by the revolving picker until the taker 20 is encountered, which causes the beets to engage the holders 16 of the conveyer. In raising the beet from the ground, the picker plates 18 take hold of the upper portion of the body of the beet with the leaves uppermost. The picker plates do not, it will be understood, penetrate the beets. The plates yield by reason of the springs 18ª to the body of the beet which is grasped firmly enough to raise it, but that is all, and owing to the weight of the body below the points where it is held by the plates 18, the beet remains with the leaves pointing upwardly until it is carried over and taken up by the taker 20. In Fig. 1 it will be noted that the front ends of the two branches that go to make up the taker 20, are relatively near together, and, as the beet comes over these neighboring ends of the taker receive the bottom or conoidal end of the beet, and the further revolution of the picker lays the beet upon the taker with its leaves toward the rear of this invention, that is to say, in the direction of and upon the conveyer chain 7. A fork 16 then comes along and removes the beet from the taker 20. As the conveyer moves it brings the beets into position for the action of the leaf cutter blade 40, and some of the leaves are severed and drop to the ground below the truck. It will be noted that the leaf cutting mechanism is located in advance of and at a lower point than the beet-topper mechanism and gages described. The beets are thus raised gradually to the topping devices, and no abrupt jerking movement is applied to them. Furthermore, they are each deprived of a certain portion of their leaves, and the topping operation is thereby rendered surer and cleaner. The beets after leaving the leaf cutter mechanism are still retained by the holders 16 of the conveyer, and when any beet comes into contact with a gage, for example with the annular gage 46, the gage and beet move along rearwardly together until the beet is deprived of its top as explained, and the conveyer turns downwardly over its rear sprocket 13. The holders no longer retain the topped beets, which fall to the ground or into a suitable receptacle carried by the truck to receive them. It will be understood that the pins projecting from the holders 16 are short, smooth and tapering. They enter the bodies of the beets but a small distance, merely sufficient to keep the beet from slipping from the the holder. As the holder with the beet turns down at the rear end of the conveyer 7, the relatively heavy body of the beet slips at once from the holder.

Considering Figs. 9 and 10, let it be supposed that the conveyer brings a beet along that is small, and does not take up either of the larger gages, but encounters gage 42. That gage only, being the most rearwardly one on the lowest sliding rod, will move to the rear, and its blade 44 alone will be actuated. But, suppose a large beet is brought along and takes up the gage 42 on the top sliding rod 28. Now, all the gages will be moved rearwardly and all the blades 44 will be actuated one after the other, but only the blade 44 belonging to gage 42 will actually reach and cut the remaining leaves of the beet, the other blades being too far in rear. The gage is quickly returned to its starting position by its return spring 29, ready to receive another beet.

Having now explained the construction of this invention and described its operation and use, what I claim is:—

1. In a beet picking and topping machine, the combination with a truck, of a beet picker supported by the truck, means actuated by the movement of the truck for operating the picker, a conveyer arranged to receive beets from the picker, a leaf cutter operated by the said conveyer, a movable beet gage arranged in the path of the beets carried by the said conveyer, and beet topping mechanism actuated by the movement of the truck and having a cutter intermittently operated by the movement of the said gage.

2. In a beet picking and topping machine, the combination with a truck, of a beet picker supported by the truck, means actuated by the movement of the truck for operating the picker, a conveyer arranged to receive beets from the picker, the said conveyer having a horizontal portion and a front downwardly-inclined portion, a leaf cutter operated by the inclined portion of the conveyer, a movable beet gage arranged in the path of the beets carried by the said conveyer, and beet topping mechanism actuated by the movement of the truck and having a cutter intermittently operated by the movement of the said gage.

3. In a beet topping machine, the combination with a truck having a revoluble axle, of a beet picker arranged near the said axle, means actuated by the said axle for operating the picker, a conveyer having one end arranged to receive beets from the said picker, the said conveyer having spaced beet-holding members constructed to engage the beets carried by the conveyer, a movable beet gage arranged in the path of the beets carried by the conveyer, guiding means for the said gage extending to the other end of the said conveyer, a return spring for returning the gage to the starting place, a movably supported knife, means actuated by the said axle for moving the said knife adjacent to the said gage, the said knife-moving means including a clutch, and projecting tripping members carried by the said gage for temporarily engaging and operating the clutch.

4. In a beet topping machine, the combination with a truck having a revoluble axle, of a beet picker arranged near the said axle, means operated by the axle for actuating the picker, a conveyer having one end arranged adjacent to the said picker for receiving the beets from the picker, the said conveyer having spaced beet-holding members, a beet gage arranged in the path of the beets carried by the said conveyer, a longitudinally movable guide rod connected with and supporting the gage whereby the gage may be moved to the other end of the conveyer, supports for the said guide rod, a return spring encircling the guide rod and connected with the said supports for returning the gage to the starting place, a movable knife, means actuated by the movement of the truck for moving the said knife adjacent to the gage, the said knife-moving means including a clutch, and projecting tripping members carried by the gage for temporarily engaging and operating the clutch.

5. In a beet picking machine, a beet picker comprising twin disks placed opposite each other, picker plates pivotally attached to the said disks near the rims thereof, and means for connecting the disks and for spacing them apart.

6. In a beet picking machine, a beet picker comprising twin dished disks placed opposite each other with their convex faces toward each other, picker plates pivotally attached to the said disks near the rims thereof, and rods connecting the convex faces of the disks and spacing the disks apart.

7. In a beet picking and topping machine, the combination with a truck, of a beet picker, means for operating the picker, a conveyer arranged to receive beets from the said picker, means for operating the conveyer, and individual sets of cutting mechanisms one set located in advance of another with respect to the frame of the truck, and means for operating the said cutting mechanisms.

8. In a beet picking and topping machine, the combination with a truck, of a beet picker, means for operating the picker, a conveyer arranged to receive beets from the said picker, means for operating the conveyer, and individual sets of cutting mechanisms one set located in advance of and arranged at a lower level than the other with respect to the frame of the said truck, and means for operating the said cutting mechanisms.

OTTO WALTHER.

Copies of this patent may be obtained for five cents each, by addressing the "Commissioner of Patents, Washington, D. C."